United States Patent [19]

Wayte

[11] Patent Number: 4,867,826

[45] Date of Patent: Sep. 19, 1989

[54] METHOD FOR MAKING LAMINATED FOAM ARTICLES

[75] Inventor: Michael J. Wayte, Taunton, United Kingdom

[73] Assignee: Actex, Inc., Warren, Mich.

[21] Appl. No.: 91,047

[22] Filed: Aug. 28, 1987

[51] Int. Cl.$^4$ .............. B32B 31/06; B32B 31/20; B31F 1/00
[52] U.S. Cl. .................... 156/219; 156/221; 156/274.8; 156/307.3; 156/307.7
[58] Field of Search .............. 156/219, 307.3, 307.7, 156/205, 220, 221, 272, 2, 273.5, 274.4, 274.8, 313, 308.6

[56] References Cited

U.S. PATENT DOCUMENTS

| | | | |
|---|---|---|---|
| 3,228,820 | 1/1966 | Samson | 156/307.3 |
| 3,503,838 | 3/1970 | Marshack | 156/307.3 |
| 3,701,707 | 10/1972 | Scholl et al. | 156/219 |
| 4,121,960 | 10/1978 | Focht | 156/219 |
| 4,160,685 | 7/1979 | Kuroda | 156/219 |
| 4,384,904 | 5/1983 | Kauffman et al. | 156/219 |
| 4,432,822 | 2/1984 | Adams | 156/219 |
| 4,519,862 | 5/1985 | Urai et al. | 156/219 |
| 4,561,917 | 12/1985 | Urai | 156/219 |
| 4,627,660 | 12/1986 | Kon | 156/219 |

Primary Examiner—Merrell C. Cashion, Jr.
Attorney, Agent, or Firm—Harness, Dickey & Pierce

[57] ABSTRACT

The present invention provides a unique and rapid method of producing a laminated foam article having permanent, pliable, decorative embossed lines or patterns which produce a relief-like article such as an embossed seat cushion or the like. In one aspect, the present invention comprises the steps of coating the surface of a foam layer with an adhesive, placing a sheet or layer of cover material on the adhesive-coated foam layer surface, compressing the covered foam layer with a die having heated projection such that regions of the foam layer adjacent the hot die melt to form embossed lines which are permanent yet pliable. Since the embossed lines are actually collapsed, melted regions of the foam layer, thick, high density foam layers may be embossed using the present invention. In another aspect, a trilaminate structure is fabricated by additionally bonding a backing layer to the side of said foam layer opposite that to which said cover material is bonded. In one embodiment, the adhesive is cured during the embossing step by the heat from a heated platen and press.

17 Claims, 1 Drawing Sheet

METHOD FOR MAKING LAMINATED FOAM ARTICLES

The present invention relates generally to laminated foam articles and more specifically to methods for fabricating embossed foam laminates.

BACKGROUND OF THE INVENTION

Various methods are known for adhering multiple sheets of materials together to form a thicker product, the properties of which differ from the individual sheets. Lamination processes of this type are used widely to adhere or bond thin sheets of flexible foam to a sheet of cover material and, in many instances, to a piece of backing material. The foam laminate is cut to the desired shape with a cutting machine. For example, a foamed article may be die cut from a laminate sheet by the impact of a die against the sheet. Hot wire cutting may also be used in some applications. These soft foam articles are then used for a number of purposes such as seat cushions, back cushions, and the like.

A variety of foams, cover materials and backings are available for use in producing shaped foam articles. The most widely used foam is polyurethane. Polyurethane is a polymer which is produced by the condensation of a polyisocyanate and a hydroxyl-containing material, usually a polyol. In order to "foam" the polyurethane to form a polyurethane foam, a blowing reaction is induced using a blowing agent. The blowing agent may comprise one or more substances which vaporize during the reaction of the polyisocyanate and the polyol such as a flurocarbon, or the blowing agent may react chemically with the isocyanate to produce a gas such as the reaction of water with isocyanate which liberates carbon dioxide. Foam softness is in part a function of the foam density with lower density imparting greater softness. One excellent polyurethane foam for use in forming foam articles is polyether polyurethane foam often referred to simply as polyether foam. Polyether serves as the polyol in the production of polyether polyurethane foam. Urethane foams can be rigid or flexible and can be made in virtually any desired thickness.

Many materials suitable for use as cover material or "body cloth" in forming a laminated foam article are also known, including both synthetic and natural fabrics, blown or cast films, or animal skins and the like. The choice of body cloth fabric or material is dictated by the end use of the laminate product. Similarly, a backing scrim which is applied to the foamed article on the foam surface opposite that to which the body cloth is adhered may be any of a number of suitable materials.

As will be appreciated by those skilled in the art, it is often necessary or desirable to emboss or impress a pattern upon a laminated foam article for decorative purposes. An embossed design on laminated foam articles is customarily used for seat and back cushions in the manufacture of motor vehicles. Several methods of producing an embossed design are known. Prior art methods include sewing or stitching the laminate such that the desired pattern is formed as the stitches compress regions of the resilient foam. That is, the laminate is sewn so that the foam is compressed along the stitching in a predetermined pattern. An embossed effect is thereby achieved since the foam which is spaced laterally from the area compressed by the stitches is raised relative to the stitching lines.

Another method for achieving an embossed or relief design is described in U.S. Pat. No. 4,400,422. There, a laminate comprising a cover layer of cloth or vinyl material, a backing material or scrim and a layer of foam interposed between the cover and scrim is processed to form intermittent raised areas. A solid object or insert in the shape of a button or the like is preferably inserted between the cover material and the foam layer. Prior to laminating the three layers, both surfaces of the foam are coated with anhydrous polyurethane foam-forming materials. The cover layer and backing are then placed in contact with the coated foam layer and moisture is introduced into the cover and backing material. The button form or the like is then inserted between the cover material and the foam layer and a heated press forces the layers against a die. Water is driven from the backing material into the anhydrous foam-forming materials whereby foaming of the anhydrous polyurethane begins.

As the foaming material expands, it penetrates the interstices of the cover material and the foam layer. In other words, as the water-activated anhydrous polyurethane begins to foam, it expands into the cover material interstices and, simultaneously, into the foam layer at the interface of the two layers. Thus, a bond is formed which secures the cover layer to the foam layer. The same process binds the scrim to the opposite side of the foam layer. In addition, the die protrusions force the two foaming regions at opposite sides of the foam layer together such that the foaming regions bond to one another. The bonding together of these two foaming regions compresses the foam layer along the lines of the die projections, in essence, bonding the cover material to the backing material. The compression of the foam layer at this bond causes a depression or embossed effect surrounding the button form insert. It is disclosed that additional embossed decorative patterns in the fabric can be formed in this manner without the use of a structural form. However, this method may only be used with relatively thin pieces of foam and produces stiff or rigid embossed lines. Moreover, this method requires that the lamination of the cover material and backing to the foam take place simultaneously with the formation of the embossed design which may be impractical in many applications. Also, in order to achieve substantial penetration of the foam layer interstices by the foaming materials, it is necessary to use a low density foam layer.

Thus it would be desirable to provide a method for making a laminated foam article having an embossed design which does not require intricate stitching of the laminate or complicated foaming processes. It would further be desirable to provide such a method which does not require that the embossing step be undertaken simultaneously with the bonding together of the layers which comprise the laminate. It would still further be desirable to provide such a method by which relatively thick foam layers can be easily embossed and which produces a pliable yet permanent decorative embossed line. The present invention provides such a method for forming an embossed laminated foam article.

SUMMARY OF THE INVENTION

Figure 1:
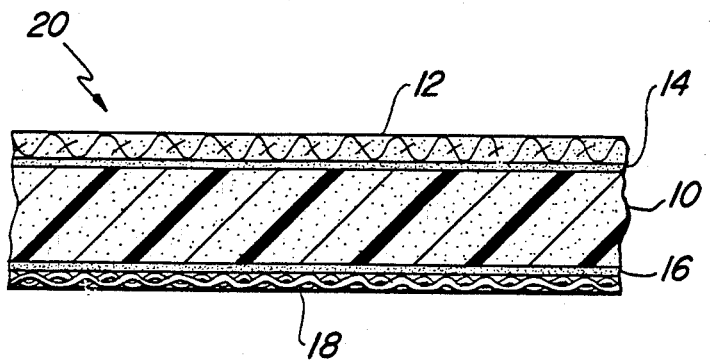
FIG. 1 of the drawings is a cross-sectional side view of a trilayer foam article in an intermediate stage of fabrication.

The present invention provides a method for fabricating a laminated article having at least one foam layer to which a cover material is bonded. The method includes the formation of compressed areas or lines of embossment to create a relief-like effect on the surface of the laminated foam article. In one aspect, the method of the present invention comprises the steps of applying an adhesive to one surface of a foam layer and then laying a cover material on the adhesive-coated foam surface. Next, heated die projections or knives in the configuration of the desired embossment pattern are pressed against the cover material and sufficient pressure is applied to compress regions of the foam layer with the die projections. The temperature of the die projections is sufficient to rapidly melt the foam to form the embossment lines or pattern corresponding to the die pattern. The adhesive uniformly bonds the body cloth to the foam layer. That is, the foam layer is at least partially coated on at least one surface with an adhesive upon which an overlay of cover material is placed. The article is then rapidly embossed using a heated die or the like to permanently impress the desired pattern into the foam article. A wet adhesive may be used wherein the embossment step is performed while the adhesive is still wet. Alternatively, the wet adhesive may be permitted to dry allowing the embossment step to be performed at a later time.

The embossed laminated foam article thus produced has an excellent bond between the cover material and the foam as well as a permanent embossed pattern. The embossment is superior to that achieved by other methods since it is formed by literally melting regions of the foam layer. The cover material is securely attached to the foam layer by the adhesive. Since it is not necessary for foaming materials to penetrate the foam layer, high density foam layers can be utilized. In otherwords, it is not necessary that the foam layer have a high degree of permeability or penetrability. Moreover, since the joining together of two layers of foaming material on opposite sides of the foam layer is not required as with some prior art methods, a relatively thick laminated foam article can be fabricated using a single thick layer of foam. Also, since the adhesive does not directly form the embossment lines or depressions, a small amount of adhesive may be used which imparts a greater overall softness to the laminated foam article. The embossment lines last indefinitely without change since they are actually melted or collapsed regions of the foam layer. By using high temperature knives or die projections, not only are the embossment lines made permanent, they are formed rapidly which reduces cycle time.

In still another aspect, a dry adhesive is used in lieu of a wet adhesive. In this version of the present invention, the laminate structure may be heated first to bond the layers together and then embossed at a later time in the described manner. Alternatively, the laminate structure may be heated to liquefy the dry adhesive, bonding the body fabric to the foam, and simultaneously embossed in the described manner.

In still another aspect, a scrim or backing material is bonded to the side of the foam layer opposite that to which the cover material is bonded. The trilayer foam article is then embossed using the hot die projections or knives in the same manner set forth for the bilayer article. Both the cover material and the scrim can be used with either the wet adhesive or dry adhesive and can be prelaminated or laminated and embossed at the same time. Although the embossed lines are permanent, they are also quite pliable.

DESCRIPTION OF THE PREFERRED EMBODIMENTS

Referring now to FIG. 1 of the drawings, the first step of the present invention is the preparation of foam layer 10 to receive cover material or body cloth 12. This includes applying a sufficient amount of a suitable adhesive 14 to one surface of foam layer 10. Adhesive 14 is shown in FIG. 1 as a layer of exaggeration proportions for the sake of clarity. Next, body cloth 12 is brought in contact with adhesive 14. Similarly, the opposite side or surface of foam layer 10 is coated with adhesive 16 to which backing or scrim 18 is joined. It is to be understood that the sequence of stacking body cloth 12, foam layer 10 and scrim 18 may vary depending upon the precise application of the present invention. It may be suitable to apply adhesives 14 and 16 directly to body cloth 12 and scrim 18, respectively, and thereafter join the adhesive coated materials to foam layer 10. Although a trilayer article 20, is illustrated, it may be desirable to omit scrim 18 in which case adhesive layer 16 would not be needed.

A number of materials are suitable for use in forming trilayer 20. However, in order to obtain compression of foam layer 10 to form the desired embossed pattern, as will be described more fully, foam layer 10 must be compressible. In many applications it will be desirable that foam layer 10 be quite soft and flexible as in those instances where the final foam article serves as a cushion or the like.

Materials which may be suitable for use as foam layer 10 can be described generally as foamed plastics which include polyethylene foams, cellulose acetate foams, ionomer foams, ABS foams, phenolic foams, polystyrene foams, syntactic foams, vinyl foams and urethane foams. It is to be understood that the composition of the foam will determine in part whether it is suitable for use in the present invention and that some species of these various classes of foams may not be suitable for use herein. It will also be understood that the choice of a foam for use as foam layer 10 will depend in part upon the desired final properties of the laminated foam article. A suitable foam must provide the desired degree of flexibility and resiliency and, as stated, be sufficiently compressible as required during the embossment step of the present invention.

Of the various suitable foams, polyurethane foams formed by the reaction of an isocyanate and a polyol along with a blowing agent are preferred. Methods for preparing a soft, flexible foam suitable for cushioning purposes using polyurethane precursors, blowing agents, and activators, will be known to those skilled in the art. The preferred polyurethane foam for use as foam layer 10 of the present invention is polyether polyurethane foam. The density of foam layer 12 is dictated by the requirements of the final product and it is a feature of the present invention that high density foams are suitable since deep foam penetration is not required. Thus, an integral-skin foam having a high density outer region is compatible with the present invention. When the preferred polyether polyurethane foam is used for foam layer 10, the preferred foam density is from approximately 14 kg/m$^3$ to about 52 kg/m$^3$. More preferred are high resilience foams having a density of from about 19 kg/m$^3$ to about 36 kg/m$^3$. The most preferred density for foam layer 10 is from approximately 29 kg/m$^3$ to about 31 kg/m$^3$.

The hardness of foam layer 10 determines in part the comfort level of the final product and can be adjusted accordingly. Thus, the degree of foam hardness is not critical to the present invention. Good comfort is provided when foam layer 10 has a hardness of from approximately 5 kg to about 26 kg as determined herein using British standard 3667 which is incorporated herein by reference. In some applications, a foam hardness outside this range may be acceptable.

One of the significant advantages of the present invention is that it allows a thick foam layer 10 to be used, although it is to be understood that the process works equally well with thin foam layers. Again, the thickness of foam layer 10 will be determined by the requirements of the final product. A preferred thickness for foam layer 10 is approximately from ⅛ inch to about 2-½ inches, more preferably from about ¾ inch to about 1-½ inches and most preferably from about 1¼ inches to about 1½ inches.

Body cloth 12 may comprise a wide variety of materials so long as it may be securely bonded to foam layer 10 using a suitable adhesive. Body cloth 12 should also be sufficiently flexible to be compatible with the embossment step of the present invention. Materials suitable for use include natural fabrics such as cotton, wool, or silk, either woven, knitted or pressed, synthetic fabrics such as nylon, polyester, polyamides and films such as cellulosic, polycarbonate, polyethylene, polypropylene, polyamide, PVC, and other materials. Processed animal skins are also suitable for use in forming body cloth 12. Similarly, scrim 18 may be made of any of the materials listed as suitable for cover material 12. It also may be desirable to make scrim 18 out of a more rigid material to add additional structural support to the finished article.

As previously indicated, body cloth 12 and scrim 18 are bonded to foam layer 10 with adhesives 14 and 16. It is to be understood that the type of adhesive actually used will depend upon a number of factors including the nature of the stresses to which the final product will be subjected, the particular geometry of the bonded area, and the type of destructive environmental elements that the final product will be exposed to. Suitable adhesives for use herein include elastomeric adhesives, such as natural rubber, neoprene, nitrile, urethane, and styrenebutadiene adhesives, thermoplastic adhesives such as polyvinyl acetate, polyvinyl alcohol, acrylic, cellulose nitrate, and polyamide adhesives, thermosetting adhesives such as phenol formaldehyde, resorcinol, epoxy, urea-formaldehyde and other adhesives such as phenolic-polyvinyl butyral, phenolic-polyvinyl formal, phenolic nylon, and polyester resins. Still other adhesives may be suitable for use herein if the principals of the present invention are faithfully observed. Of these suitable adhesives, the most preferred for use in bonding cover material 12 and scrim 18 to foam layer 10 is a polyurethane adhesive having from about 20% to about 80% by volume solids and more preferably from about 40% to 50% by volume solids. It will be understood that the adhesive contains a solvent component.

In order to achieve good bonding of body cloth 12 and scrim 18 to foam layer 10 without reducing the softness and thus the comfort of the finished article, it is preferred that only a light application of the adhesive be used. Also, once cured or solidified, the adhesive should not produce a stiff or hard region, which would impair the softness and thus comfort level of the finished article. As will be shown, the adhesive does not create the embossed pattern, and thus only a minor amount of adhesive is needed. It should also be pointed out that the adhesive may or may not be a temperature sensitive adhesive which can be cured with heat. For best results a solvent based adhesive is used to give a low surface weight of adhesive. Of course, the solvent evaporates during processing. A dry adhesive is used in those applications where softness of the finished article is not as important. The amount of adhesive required will depend somewhat on the nature of the materials used for foam layer 10, body cloth 12 and scrim 18, but for most purposes the application of from about 30 to 150 grams of adhesive per square meter of surface of foam layer 10 and, more preferably, from about 100 to about 120 grams of adhesive per square meter of foam layer 10 gives excellent results. The entire surface of body cloth 12 is bonded in this manner to foam layer 10 so that no puckering or wrinkling of body cloth 12 relative to foam layer 10 occurs during the embossing process. The adhesive is preferably wet polyurethane, but a dry adhesive may also be used. Use of a wet adhesive results in a more flexible and pliable final article. In those instances, as will be explained, where the layers of article 20 are bonded together before embossment, some of these adhesives will allow simple hand lay-up to form a good bond between the layers. For others, low-pressure press molding may be required. Flame lamination or other traditional lamination methods may also be employed. However, in a preferred embodiment of the present invention, wet or liquid polyurethane adhesive is used and, while the adhesive is still wet, trilayer article 20 is embossed by a method which substantially dries or cures the liquid adhesive.

Figure 2:
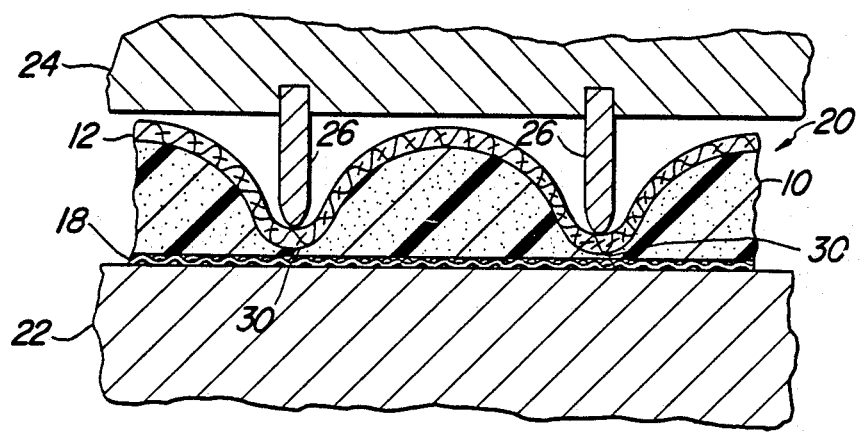
FIG. 2 of the drawings is a cross-sectional side view of the article shown in FIG. 1 illustrating the formation of a decorative embossed pattern in accordance with the present invention.

Referring now to FIG. 2 of the drawings, trilayer article 20 is seen on platen 22. Trilayer article 20 is positioned on platen 22 with scrim 18 in contact with the surface of platen 18 which, in a preferred embodiment, is heated. In those embodiments in which scrim 18 is absent, foam layer 10 is placed in direct contact with platen 22. A suitable low pressure press 24 or the like having die projections or knives 26 is then pressed against trilayer article 20 in contact with body cloth 22. The movement of press 24 and thus knives 26 continues toward platen 22 to compress foam layer 10. Projections or knives 26 are arranged in the pattern of the desired embossed design.

Figure 3:
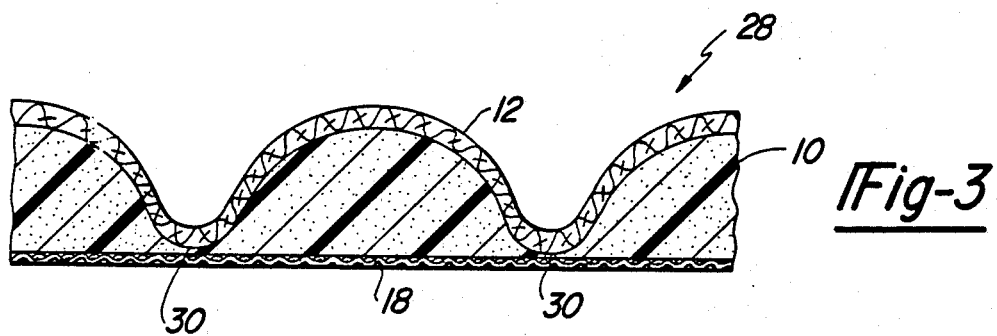
FIG. 3 is a cross-sectional side view of the completed foam article after the decorative pattern has been embossed thereon.

During the compression of foam layer 10 by knives 26, knives 26 are at a predetermined temperature sufficient to rapidly melt the compressed areas of foam layer 10 which are immediately adjacent knives 26. Depending upon the embossing tool used, press 24 would generally also be heated. As the compressed areas of foam layer 10 are liquefied or melted by the heat and pressure of knives 26, the foam cells collapse forming a hard but pliable region corresponding to the contact surface of knives 26. Once collapsed, these melted regions of foam layer 10 do not recover. That is, and referring now also to FIG. 3 of the drawings, they solidify in the collapsed state such that the desired pattern is embossed on the finished laminated foam article 28. Having formed an adhesive bond between the trilayers, adhesives 14 and 16 are not depicted. In those embodiments where a wet adhesive is used, the heat which radiates from knives 26 and press 24 helps to cure or dry the adhesive. Additional bonding of body cloth 12 to foam layer 10 at the collapsed foam regions 30 is obtained since the liquefied foam penetrates body cloth 12 slightly, forming a bond on solidification. It is also preferred that a heated platen 22 be used during the embossing step in those instances where scrim 18 is used, which promotes the bonding of scrim 18 to foam layer 10 with the adhesive, again by curing or drying.

Figure 4:
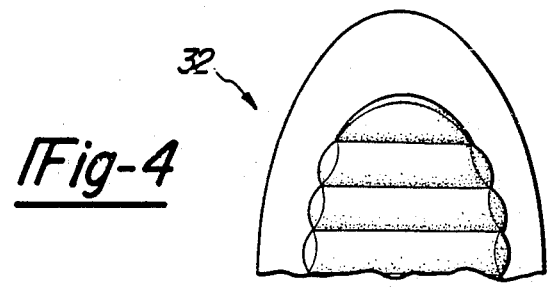
FIG. 4 is a front elevational view of an embossed seat cushion fabricated using the method of the present invention.

One of the advantages of the present invention is that the embossing process can be carried out rapidly using relatively high heats. It is preferred that those portions of knives 26 which contact trilayer article 20 be at a temperature of from about 150° to about 250° C., a range which produces especially good results. The compression contact time by knives 26 on trilayer article 20 is a function of the thickness of the article layers and the nature of the materials, but is preferably from about 30 to 90 seconds and most preferably about 60 seconds which provides a fast cycle time. The time required will also depend upon the temperature of knives 20. The contact time should be just sufficient with these other factors taken into consideration to collapse and melt the foam to form the embossed lines or pattern. A cushion 32 fabricated in accordance with the present invention is shown in FIG. 4 having a decorative pattern embossed thereon.

It may be possible and desirable in some applications, to prelaminate trilayer article 20 using traditional methods and emboss at a later date. It may also be suitable and desirable in some applications to eliminate the use of an adhesive by simply stacking body cloth 12, foam layer 10 and scrim 18 and then bonding the three layers together with the heat of the press and platen during the embossing step. It will be understood that the collapsed foam regions 30 adhere to body cloth 12 and scrim 18.

Having now fully described this invention, it will be understood by those of ordinary skill in the art that the same can be performed within a wide and equivalent range of parameters, conditions and methodology without affecting the spirit or scope of the invention or any embodiments thereof.

What is claimed is:

1. A method for making a laminated foam article comprising the steps of:
    applying an adhesive to one surface of a compressible foam layer, said adhesive applied in a concentration of about 30 to 150 grams of adhesive per square meter;
    directly contacting said adhesive-bearing surface of said foam layer with a layer of cover material selected from the group consisting of natural fabrics and synthetic fabrics to form a bilayer;
    placing said bilayer on a platen;
    contacting said cover material layer of said bilayer with at least one heated projection at a temperature from about 150° to about 250° C.;
    producing relative movement of said platen and said heated projection to compress regions of said foam layer adjacent said heated projection;
    melting and collapsing said compressed regions of said foam layer using the heat of said projections for a period from about 30 to about 90 seconds to form permanent embossed lines in said bilayer; and
    removing said projections from said bilayer and solidifying said melted collapsed regions of said foam layer.

2. The method for making a laminated foam article recited in claim 1 wherein said foam layer includes polyurethane foam.

3. The method for making a laminated foam article recited in claim 1 wherein said foam layer includes polyether polyurethane foam.

4. The method for making a laminated foam article recited in claim 1 wherein said foam layer has a density of from approximately 14 kg/m³ to 52 kg/m³.

5. The method for making a laminated foam article recited in claim 1 wherein said foam layer has a thickness of from approximately ⅛ inch to about 2½ inches.

6. A method for fabricating a laminated foam article comprising:
    providing a layer of foam having two sides;
    coating said sides of said foam layer with a heat curable adhesive, said adhesive applied in a concentration of about 30 to 150 grams of adhesive per square meter;
    directly contacting one of said heat curable adhesive coated sides of said foam layer with a cover material selected from the group consisting of natural fabrics and synthetic fabrics to form a bilayer;
    contacting the other heat curable adhesive coated side of said foam layer with a backing material to form a trilayer;
    placing said trilayer on a platen with said backing material adjacent said platen;
    providing a press having an attached die, said die having die projections at a temperature from about 150° C. to about 250° C.;
    contacting said cover material of said trilayer with said die projections;
    compressing said regions of said trilayer on said platen by causing relative movement of said die projections toward said platen;
    conducting heat through said die projections to collapse areas of said foam layer in the region of said die projections for a period from about 30 to about 90 seconds to collapse and liquefy said regions of said foam layer;
    heating said platen and said press;
    curing said adhesive with said heat from said heated press and heated platen;
    removing said die projections from said trilayer;
    whereby said melted regions of said foam layer solidify forming embossed lines and whereby said cured adhesive bonds said cover material and said backing material to said foam layer.

7. The method for making a laminated foam article recited in claim 6 wherein said foam layer includes polyurethane foam.

8. The method for making a laminated foam article recited in claim 6 wherein said foam layer includes polyether polyurethane foam.

9. The method for making a laminated foam article recited in claim 6 wherein said foam layer has a density of from approximately 14 kg/m³ to 52 kg/m³.

10. The method for making a laminated foam article recited in claim 6 wherein said foam layer has a thickness of from approximately ⅛ inch to about 2½ inches.

11. A method for fabricating a laminated foam article comprising the steps of:

coating one surface of a layer of foam with an adhesive, said adhesive applied in a concentration of about 30 to about 150 grams of adhesive per square meter;

placing a layer of cover material directly on said adhesive-coated surface of said foam layer, said cover material being selected from the group consisting of natural fabrics and synthetic fabrics;

curing said adhesive to bond said layer of cover material to said foam layer;

compressing regions of said foam layer with heated die projections at a temperature from about 150° C. to about 250° C. for a period from about 30 to about 90 seconds to melt said regions of said foam layer; and solidifying said melted regions of said foam layer to form an embossed pattern.

12. A method for making a laminated foam article comprising the steps of:
(a) providing a solvent-based adhesive;
(b) applying a coating of said solvent-based adhesive to one surface of a compressible foam layer, said adhesive applied in a concentration of about 30 to about 150 grams of adhesive per square meter;
(c) directly contacting said coated surface of said compressible foam layer with a cover material selected from the group consisting of natural fabrics and synthetic fabrics to form a bilayer;
(d) placing said bilayer on a platen;
(e) concentrating said cover material of said bilayer with at least one heated projection at a temperature from about 150° C. to about 250° C.,
(f) drying said solvent-based adhesive to bond said cover layer to said compressible foam layer;
(g) producing relative movement of said platen and said heated projection to compress regions of said foam layer adjacent said heated projection;
(h) melting and collapsing said compressed regions of said foam layer using the heat of said projections for a period from about 30 to about 90 seconds to form permanent embossed lines in said bilayer; and
(i) removing said projections from said bilayer and solidifying said melted collapsed regions of said foam layer;

whereby said cover layer is securely bonded to said compressible foam layer and said bilayer is permanently embossed.

13. The method recited in claim 12, wherein said compressible foam layer is polyether polyurethane foam.

14. The method recited in claim 12, wherein step (f) is carried out during steps (c) through (i).

15. A method for fabricating a laminated foam article comprising:
(a) providing a layer of foam having two sides;
(b) providing a heat curable, solvent-based adhesive;
(c) coating said sides of said foam layer with said adhesive, said adhesive applied in a concentration of about 30 to about 150 grams of adhesive per square meter;
(d) directly contacting one of said adhesive-coated sides of said foam layer with a cover material selected from the group consisting of natural fabrics and synthetic fabrics to form a bilayer;
(e) contacting the other adhesive-coated side of said foam layer with a backing material to form a trilayer;
(f) placing said trilayer on a platen with said backing material adjacent said platen;
(g) providing a press having an attached die, said die having die projections at a temperature from about 150° C. to about 250° C.;
(h) contacting said cover material of said trilayer with said die projections;
(i) compressing said regions of said trilayer on said platen by causing relative movement of said die projections toward said platen to produce compressed areas of said foam layer;
(j) conducting heat through said die projections for a period from about 30 to about 90 seconds to compressed areas of said foam layer in the region of said die projections to collapse and liquefy said compressed areas of said foam layer;
(k) heating said platen and said press;
(l) drying and curing said adhesive with said heat from said heated press and said heated platen;
(m) removing said die projections from said trilayer; whereby said melted regions of said foam layer solidify forming embossed lines and whereby said cured adhesive bonds said cover material and said backing material to said foam layer.

16. The method recited in claim 15, wherein said compressible foam layer is polyether polyurethane foam.

17. The method of claim 15, wherein step (l) is carried out during steps (d) through (m).

* * * * *